United States Patent [19]
Johnson et al.

[11] Patent Number: 5,539,736
[45] Date of Patent: Jul. 23, 1996

[54] METHOD FOR PROVIDING LAN ADDRESS DISCOVERY AND TERMINAL EMULATION FOR LAN-CONNECTED PERSONAL COMPUTER (PCS) USING XEROX NETWORK SYSTEM (XNS)

[75] Inventors: Robert A. Johnson, Pottstown; Sarah K. Inforzato, Downingtown; Jonathan Skilton, Norristown, all of Pa.

[73] Assignee: Unisys Corporation, Blue Bell, Pa.

[21] Appl. No.: 317,569

[22] Filed: Oct. 4, 1994

Related U.S. Application Data

[63] Continuation of Ser. No. 999,113, Dec. 31, 1992, Pat. No. 5,379,296.
[51] Int. Cl.$^6$ .................................................... H04J 3/24
[52] U.S. Cl. .................. 370/60; 370/85.13; 370/94.1
[58] Field of Search ............................ 370/60, 85.13, 370/85.14, 94.1, 94.3, 110.1, 82, 61, 85.1, 85.15, 92, 99; 340/825.02

[56] References Cited

U.S. PATENT DOCUMENTS

| | | | |
|---|---|---|---|
| 4,691,314 | 9/1987 | Bergins et al. | 370/94.1 |
| 4,706,081 | 11/1987 | Hart et al. | 370/61 |
| 4,831,620 | 5/1989 | Conway et al. | 340/825.05 |
| 4,947,390 | 8/1990 | Sheehy | 370/85.13 |
| 5,050,166 | 9/1991 | Cantoni et al. | 370/94.1 |
| 5,163,045 | 11/1992 | Caram et al. | 370/60 |
| 5,278,829 | 1/1994 | Dunlap | 370/94.1 |
| 5,309,437 | 5/1994 | Perlman et al. | 370/85.13 |

FOREIGN PATENT DOCUMENTS 508886  10/1992  European Pat. Off.

OTHER PUBLICATIONS

Novell's Manual for the ODI Shell for DOS (1990).
Seifert, "Bridges and Routers", *IEEE Network* vol. 2, No. 1 (Jan. 1988).
Perlman et al., "Choosing the Appropriate ISO Layer for LAN Interconnedtion", *IEEE Network*, vol. 2, No. 1 (Jan. 1988).
Johnson, "LAN∝Connected Workstations Via BNAv2, Part 1; UNISPHERE", (Jan. 1992); Part 2, (May 1992); and Part 3, (May 1992).
Cypser, *Communications for Cooperating Systems, OSI, SNA, and TCP/IP* (1991).
*Advanced Netware V2.1 Internetwork Packet Exchange Protocol (IPX) with Asynchronous Event Schedular (AES)*, Revision 2.0, Novell Incorporated, (Jun. 1987).
*Advanced Netware V.1 Sequenced Packet Exchange Protocol (SPK)*, Revision 2.0, Novell Incorporated (Jun. 1987).
*Internet Transport Protocols*, Xerox Corporation (Dec. 1981).
R. J. Cypser, *Communications for Cooperating System OSI, SNA, and TCP/IP*, cover, pp. 1–21 and 23–44 (chapters 1 and 2) (1991).
International Search Report from PCT Office for International Application No. PCT/US93/12644, mailing date Jun. 20, 1994.
Black, Uyless; OSI A Model for Computer Communications Standards; 1991, pp. 23–25 & 219.
Deasington, X.25 Explained Protocols for Packet Switching Networks, pp. 61–63 (1985).

*Primary Examiner*—Benedict V. Safourek
*Assistant Examiner*—Chau T. Nguyen
*Attorney, Agent, or Firm*—Ratner & Prestia

[57] ABSTRACT

An interface which enables a LAN connected workstation to concurrently communicate with a plurality of computer platforms having respective network architectures over the same physical connection. The interface receives data from a LAN connection, examines the data and identifies the format being used. Based on the identified format, the interface determines the appropriate destination for the data and sends the data to that destination. Additionally, the interface enables a workstation running XNS software to run terminal emulation programs at the increased speed available from a LAN connection by enhancing the XNS protocol with (1) message segmentation and reassembly, (2) maximum packet size negotiation and (3) LAN address discovery.

2 Claims, 15 Drawing Sheets

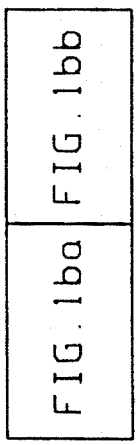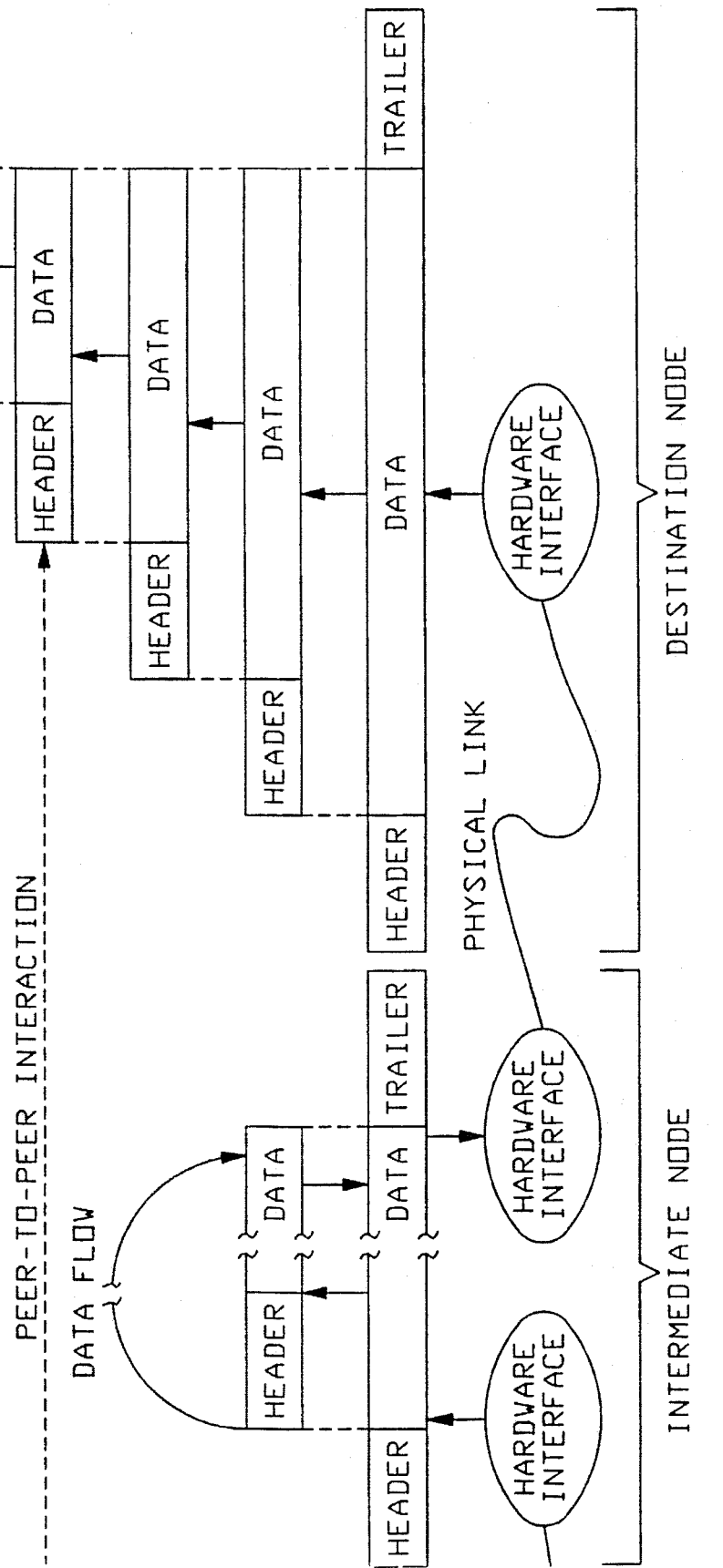

LAN ENVIRONMENTS

| CLIENT LAYER | BNA ROUTER | BNA TERMINAL GATEWAY | OSI | SNA | BNA TERMINAL GATEWAY | | TCP/IP |
|---|---|---|---|---|---|---|---|
| DATA LINK LAYER | PROPIETARY CPLAN LLC | | IEEE 802.2 COSI LLC | IEEE 802.2 COS2 LLC | LCW | BOOT SERVICES | ETHERNET MAC |
| | | | | | | XNS | |
| | PROPIETARY CPLAN MAC | | IEEE 802.3 MAC | | | | |
| PHYSICAL LAYER | CSMA/CD | | | | | | |

FIG. 2a

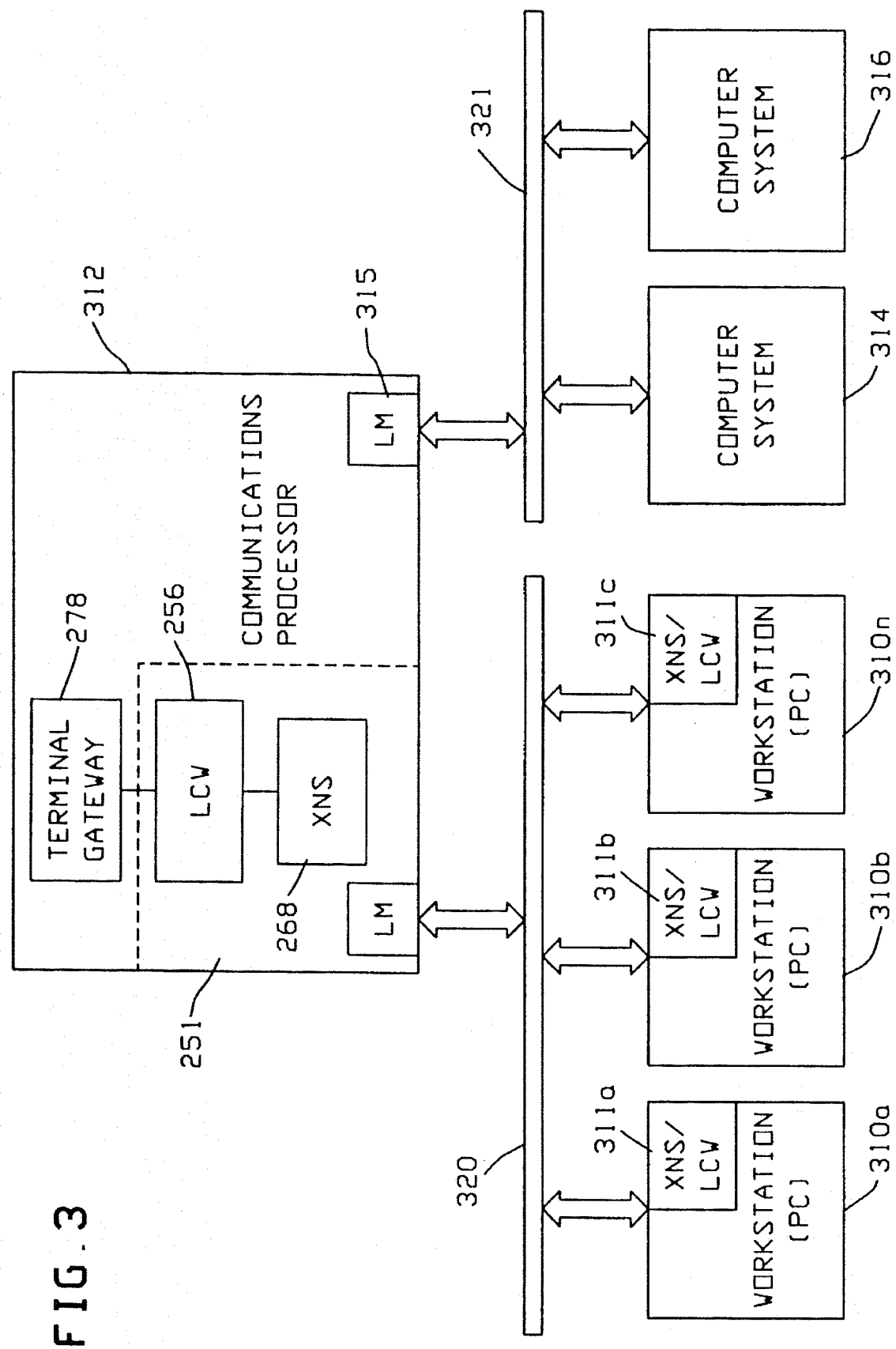

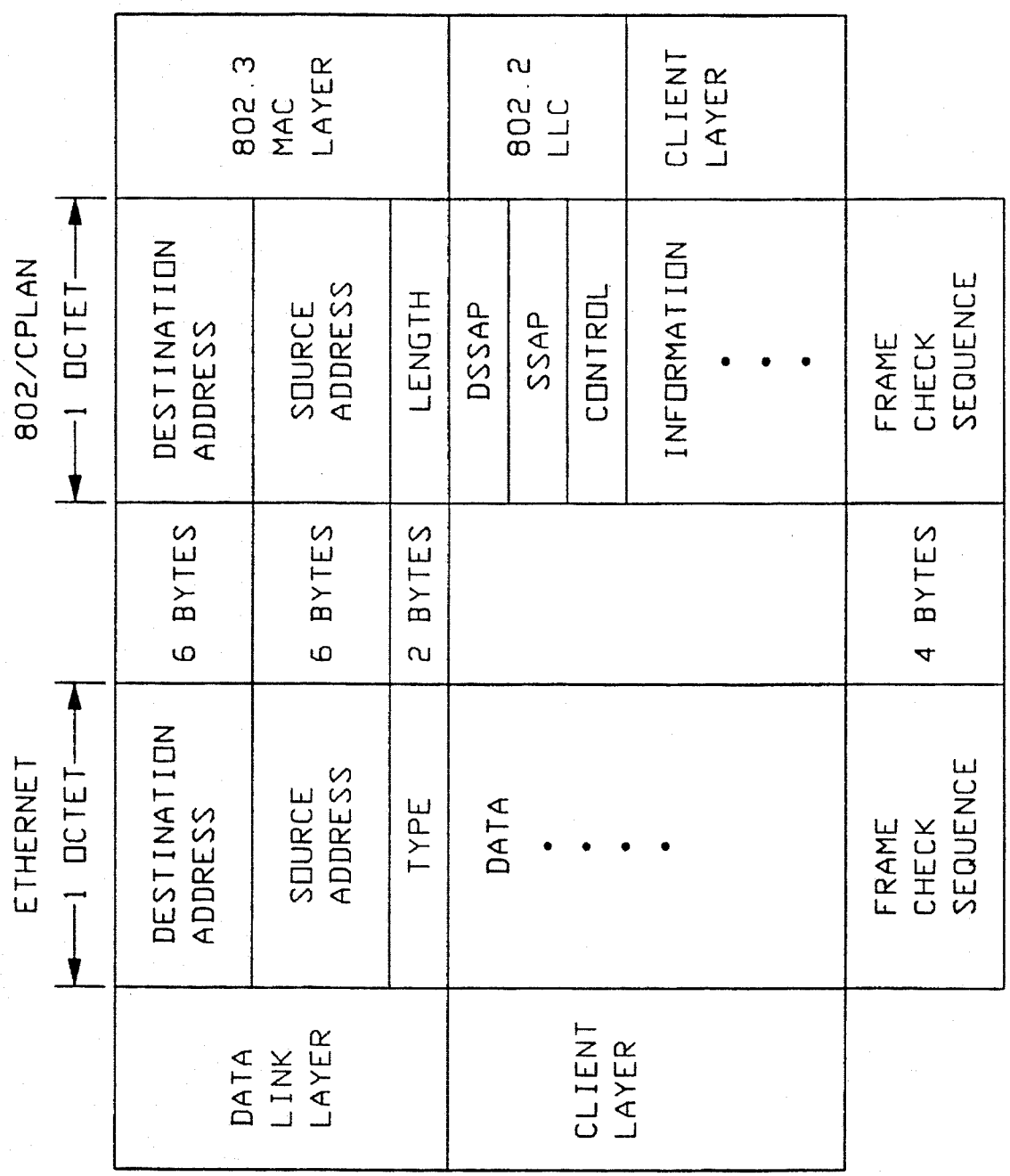

FRAMES WHICH ARE NOT BROADCAST OR MULTICAST ARE PARSED BY
THE FOLLOWING ALGORITHM:

602 — 1) IF TYPE/LENGTH < 1500 THEN GO TO 5)

604 — 2) IF CONTROL_FIELD = UI OR TEST AND
        SSAP = ROUTER AND DSAP = ROUTER THEN
        •CPLAN FRAME.GO TO 10)

606 — 3) IF CHECKSUM = #FFFF THEN
        •XNS FRAME.GO TO 10)

608 — 4) •ETHERNET FRAME.GO TO 10)

610 — 5) IF CHECKSUM = #FFFF THEN
        •XNS FRAME.GO TO 10)

612 — 6) SEARCH FOR STA WITH REMOTE_ADDRESS = FRAME_SOURCE_ADDRESS
        IF NOT STATION_FOUND THEM GO TO 9)

614 — 7) IF CLASS = CPLAN OR CPLAN802 THEN
        •CPLAN FRAME.GO TO 10)

616 — 8) IF CLASS = COS2 THEN
        •COS2 FRAME.GO TO 10)

618 — 9) •COS1 FRAME

620 — 10) END

FIG.6

RECEIVE FRAME HANDLER

| BROADCAST | | | NON-BROADCAST | | | | |
|---|---|---|---|---|---|---|---|
| TYPE/LEN > 1500 | TYPE/LEN > 1500 | | TYPE/LEN > 1500 | | | TYPE/LEN > 1500 | |
| XNS FF | XNS FF | ELSE | XNS FF | CPLAN FF | ELSE | XNS FF | DSAP RTR | DSAP OSI |
| XNS | XNS | COS1 | XNS | CPLAN | ETHIP | XNS | CPLAN | COS1 |
| ETHIP | | | | | | | | |

XNS FF: CHECKSUM = #FFFF

CPLAN FF: (CTRL = UI OR TEST) AND (SAP = ROUTER)

FIG. 7

METHOD FOR PROVIDING LAN ADDRESS DISCOVERY AND TERMINAL EMULATION FOR LAN-CONNECTED PERSONAL COMPUTER (PCS) USING XEROX NETWORK SYSTEM (XNS)

This application is a continuation of application Ser. No. 07/999,113, filed Dec. 31, 1992, U.S. Pat. No. 5,379,296.

FIELD OF THE INVENTION

The present invention relates generally to an interface for enabling a workstation to communicate with a plurality of computer platforms and, more particularly, to an interface for enabling a LAN-connected workstation to communicate concurrently with a plurality of computer platforms having respectively different data-link protocols.

BACKGROUND OF THE INVENTION

The increasingly sophisticated information processing needs of today's work environment include the concept of an integrated desktop, from which users can access a variety of computer systems having various network architectures. Examples of different computing systems and associated network architectures include UNIX systems using Transmission Control Protocol/Internet Protocol (TCP/IP), Unisys A-series systems using Burroughs Network Architecture (BNA), and IBM mainframes using Systems Network Architecture (SNA).

In such a network environment, there is a need to make the user's access to the various computing systems transparent. In other words, the user should have access to any of the computing systems without the need to reconfigure his integrated desktop (e.g., PC). For example, users may want to move seamlessly from an A-series Menu-Assisted Resource Control (MARC) session to U6000 E-mail, or from a UTS session to a spreadsheet accessing data files on a NetWare server.

With PC platforms such as Microsoft Windows™, the integrated desktop is a reality, and consequently the interoperability of network architectures is a fundamental requirement. Clearly, a coherent strategy, along with the appropriate system support, for communicating with all of the computing systems in an integrated environment is desirable.

Part of this strategy may include local area networks. Workstations connected via local area networks have become increasingly important in recent years because they offer computer users shared access to common resources such as storage, input/output, communication devices, etc. When the access to the common resources are beyond the reach of the local area network, a communication server or relay is often employed because a resource is shareable only among systems with identical protocol "stacks". Thus, the communication server performs the necessary protocol translations, depending upon the network layer at which the communication is occurring, to allow internetwork (or inter-protocol) communication.

As background to the possible network layers in which a relay may operate, FIG. 1a illustrates a taxonomy for describing LAN interconnection. The taxonomy associates a LAN interconnection device with an ISO Reference Model layer. Each device is associated with the layer in which it relays information from one network to another. The term network in this context ranges from LAN segments, satellite links, and terrestrial lines in the lower layers to network architectures (e.g., OSI and SNA) in the higher layers.

In this taxonomy it is important to note that the layer performing the relay does not utilize information from the higher layers. In fact, differing higher layer protocols can concurrently utilize the same lower layer relay. Generally, the higher the relay layer, the more specialized are the set of products and protocols serviced by the relay. Also, factors such as overhead and complexity increase with higher layer numbers.

The relay is generally termed a bridge if it operates at the data link layer (which typically comprises two sublayers: logical link control (LLC) and media access control, (MAC) layers). A bridge connects data links for the purpose of forwarding packets between local networks, thereby effectively forming an extended local network.

If the relay operates at the network layer it is generally called a router. A router differs from a bridge in that a bridge generally operates transparently to the communicating end stations while a router is explicitly addressed by end stations requiring routing services. And, if the relay operates at any of the higher layers it is generally known as a gateway.

FIG. 1b illustrates the data flow through respective network layers from a source node to an intermediate node to a destination node. The addition or removal of header (or trailer) data is noted to illustrate the transformation of the data packet which may take place at each network layer, thus, preparing it for the next layer (whether up or down).

SUMMARY OF THE INVENTION

The present invention is embodied in a method and apparatus that enables a workstation to communicate with a plurality of different computer platforms. The workstation is coupled to an interface processor via a local area network connection, and the interface processor is coupled to multiple computer platforms. Data, having one of a group of specific formats, is sent by the workstation destined for one of the computer platforms or by one of the computer platforms destined for the workstation. The data is first received by the interface processor. The interface processor, which initially does not know the specific format being used by the data, examines the data to identify its format. The interface processor then determines the destination of the data and transmits the data to the identified destination. Also, the interface processor allows multiple computer platforms to communicate with multiple workstations over a common physical link.

BRIEF DESCRIPTION OF THE DRAWINGS

The invention is best understood from the following detailed description when read in connection with the accompanying drawings, in which:

FIG. 2a is a chart of network/protocol layers illustrating the network environments suitable for use with the present invention;

FIG. 2b is a high-level functional block diagram illustrating the possible data paths through the network/protocol layers shown in the chart of FIG. 2a;

FIG. 3 is a functional block diagram of an exemplary system suitable for use with the present invention;

FIG. 5 is a data structure diagram comparing and contrasting the frame formats for Ethernet and 802/CPLAN;

FIG. 6 is a psuedo-code representation of a procedure for parsing and identifying the various frame formats;

FIG. 7 is a functional in block diagram which illustrates the operation of the procedure shown in FIG. 6 as well as a procedure for handling broadcast and multicast frames;

DETAILED DESCRIPTION OF THE INVENTION

I. Overview

One aspect of the interface of the present invention enables a workstation to communicate with a plurality of computer platforms having respectively different network architectures at the same time over the same physical connection. Another aspect of the interface of the present invention enables a workstation running XNS software to run terminal emulation programs at the increased speed available from a LAN connection versus, for example, a Poll/Select configuration.

Figure 1A:
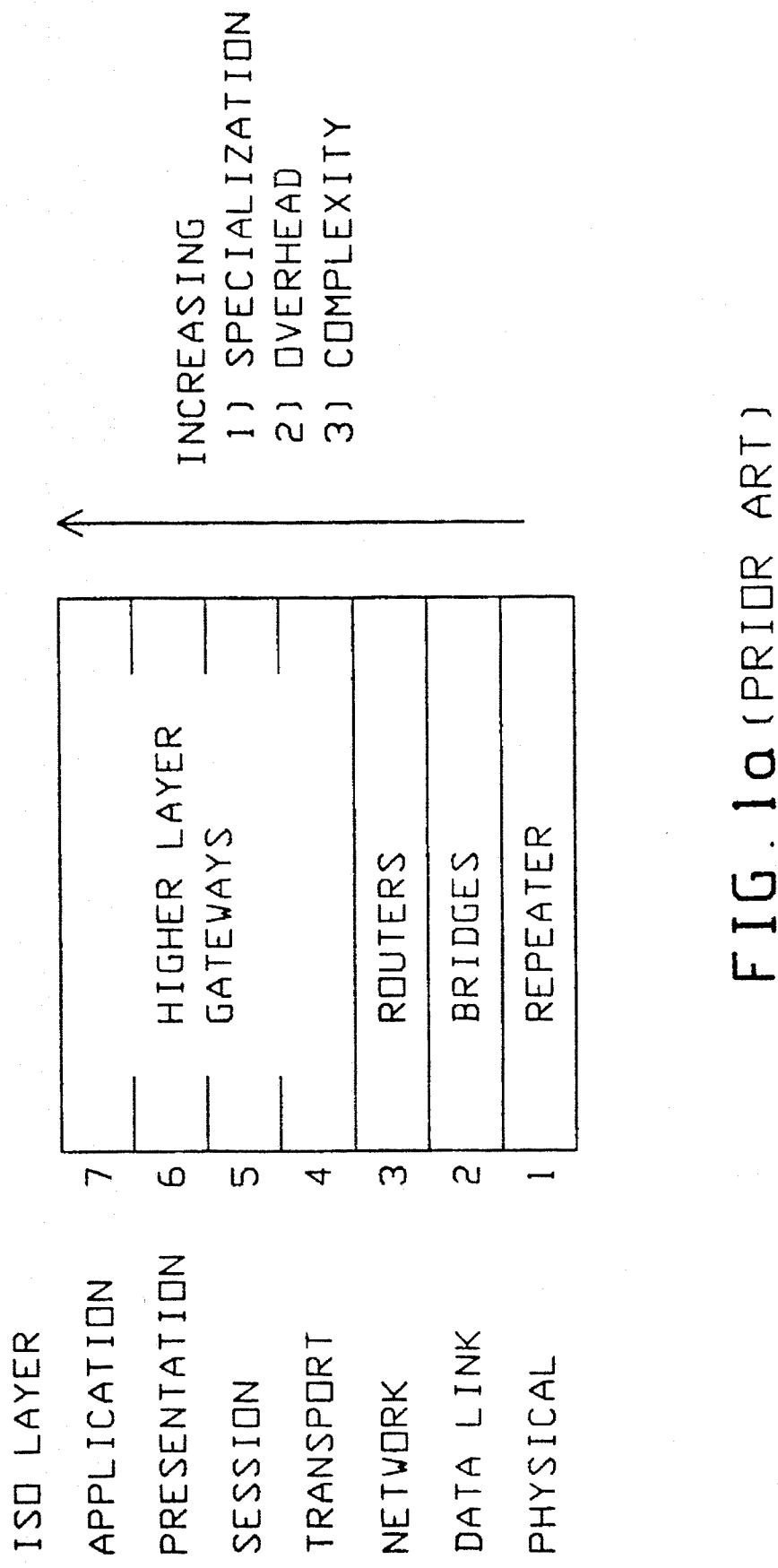
FIG. 1a is a block diagram illustrating a prior art LAN interconnect taxonomy.
Figure 1B:
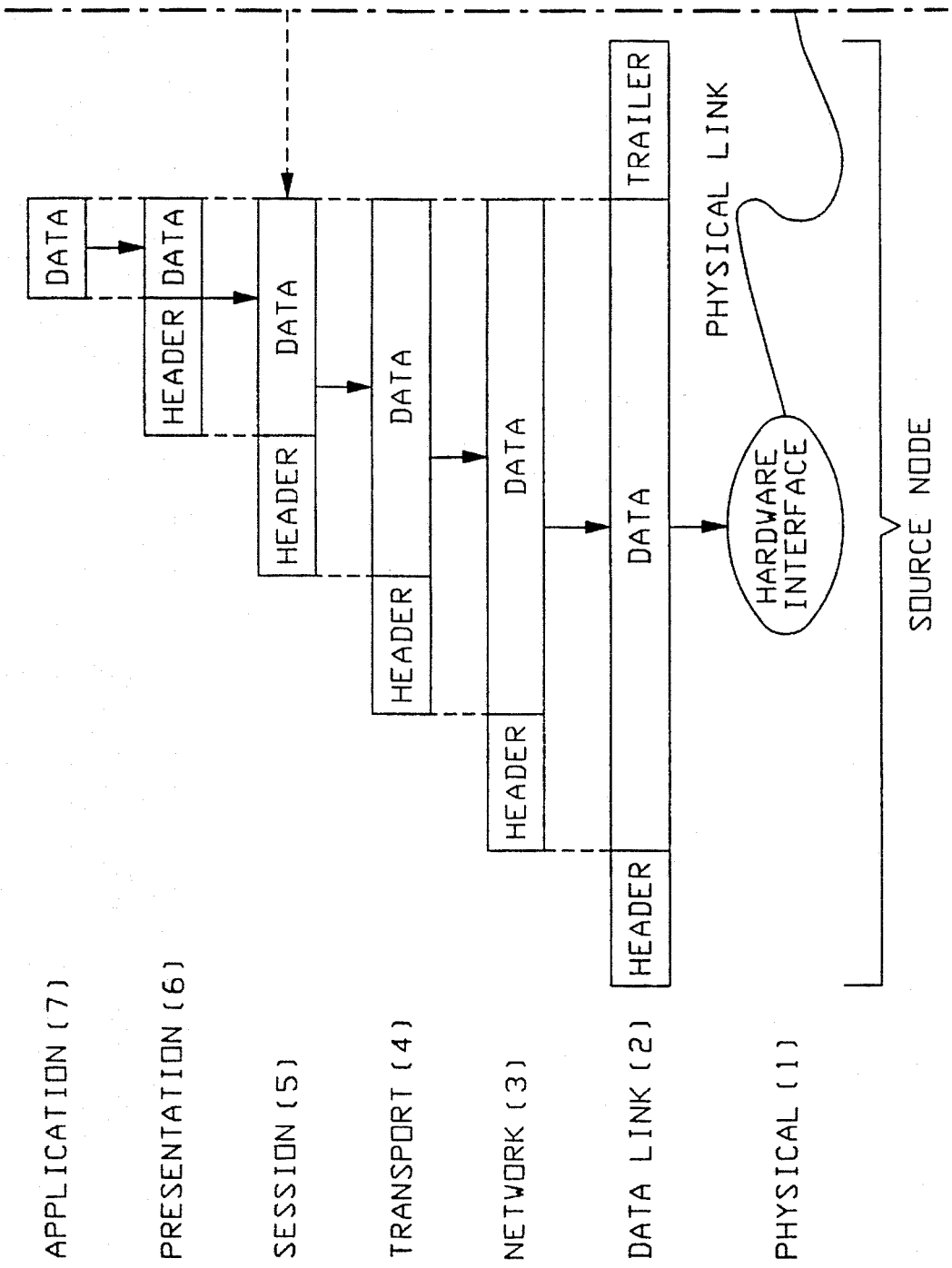
FIG. 1b is a prior art block diagram illustrating the data flow of a data packet from a source node to an intermediate node to a destination node through a router.

FIG. 2a, corresponding to the generic illustration of FIG. 1a, shows the potential network architectures (and associated network layers) supported by the exemplary embodiment of the present invention. The ability to support multi-protocol systems becomes significant as the demand for integrating separate multi-vendor systems at a single site increases.

Starting at the top layer, a variety of clients (or network architectures) can be served such as OSI, SNA and TCP/IP along with the BNA Bias Router and BNA Terminal Gateway.

Below the client layer is the data link layer. The data link layer, with the exception of the TCP/IP environment, is divided into two sublayers: a medium access control (MAC) layer and a logical link control (LLC) layer. As shown in FIG. 2a, supported at the LLC layer are the protocols of proprietary CPLAN, Class of Service 1 (COS1), Class of Service 2 (COS2), as well as a combination of Xerox Network Systems (XNS) and LAN-connected Worstations (LCW).

Although the COS1, COS2 and XNS protocols of this layer are well known in the art, the LCW protocol is new. This protocol represents an aspect of the present invention which provides an extension of the XNS protocol to enable a workstation running XNS to access and effectively utilize other systems through the BNA terminal gateway.

Briefly, the extension includes providing (1) message segmentation and reassembly, (2) renegotiation of maximum packet size, and (3) discovery of LAN partner addresses. The extension to XNS enables workstations, previously restricted by slow data communication rates (e.g., 9,600 baud), to run terminal emulation software at significantly faster speeds (i.e., those supported by LAN connections). Thus, the workstation's file server connection is used as a high-speed terminal transport mechanism. Additionally, several distributed application systems are supported. The extension is further described in the LCW section with reference to Tables 3a–3g.

Referring back to FIG. 2a, supported at the MAC layer are the protocols of proprietary CPLAN MAC, IEEE 802.3 MAC and Ethernet.

Finally, at the bottom, FIG. 2a indicates that all connections at the physical layer are made using the carrier sense multiple access/collision detection (CSMA/CD) technique. Although in the exemplary embodiment CSMA/CD is used to access the interface, other physical layer methods can be used with the aid of a MAC-layer bridge (e.g., a token ring LAN can be supported if used in conjunction with an IBM 8209 bridge).

As described above, another aspect of the present invention allows a workstation to seamlessly communicate with computer platforms supported by the variety of network architectures (e.g., SNA and OSI) concurrently over the same physical connection.

FIG. 3 is a functional block diagram showing an example system, including workstations 310a–n, an interface or communications processor (CP) 312 and mainframe computers systems 314, 316, which is suitable for use with the present invention. Workstations 310a–n are interconnected via interfaces 311a–n to a LAN 320. Connected to LAN 320, via a line module (LM) 251, is CP 312. CP 312, in turn, is connected, by a line module 315, to two different computer systems 314, 316 (e.g., A-series Unisys computer and an IBM mainframe). In the Exemplary embodiment of the invention, each of the computer systems 314 and 316 has a separate connection to LAN 320 through the LM 251.

In this example, the functionality for enabling a workstation 310a to seamlessly communicate with a plurality of computer platforms 314, 316 resides in CP 312. Each computer system 314 and 316, in this example, has separate data link protocols (e.g., for an IBM mainframe: data link layer is 802.3/COS 2).

To seamlessly communicate with different computer platforms concurrently along the same connection means that a workstation can maintain a communication link with both the A-series 314 (platform 1) and the IBM mainframe 316 (platform 2) concurrently over the same physical connection. Although this may require multi-protocol software support running on the workstation, the present invention can support it. An example of such software support is found in Novell's NetWare guide for the ODI Shell for DOS.

To enable a workstation 310a to communicate with a plurality of computer platforms concurrently over the same connection, the CP 312 determines in what format the data is received. This determination is made based only on the received data, that is to say, without advance knowledge. To accomplish this, CP 312 examines each received data frame and identifies its format (e.g., COS1, COS2, XNS, etc.). The examination and identification are based on the differences of the formats for different protocols.

Once the format is identified, CP 312 extracts information from the data frame, to determine the destination of the data, and services the communication link by passing this data to the appropriate client (e.g., SNA gateway, BNA terminal gateway, IP router, etc).

Figure 2B:
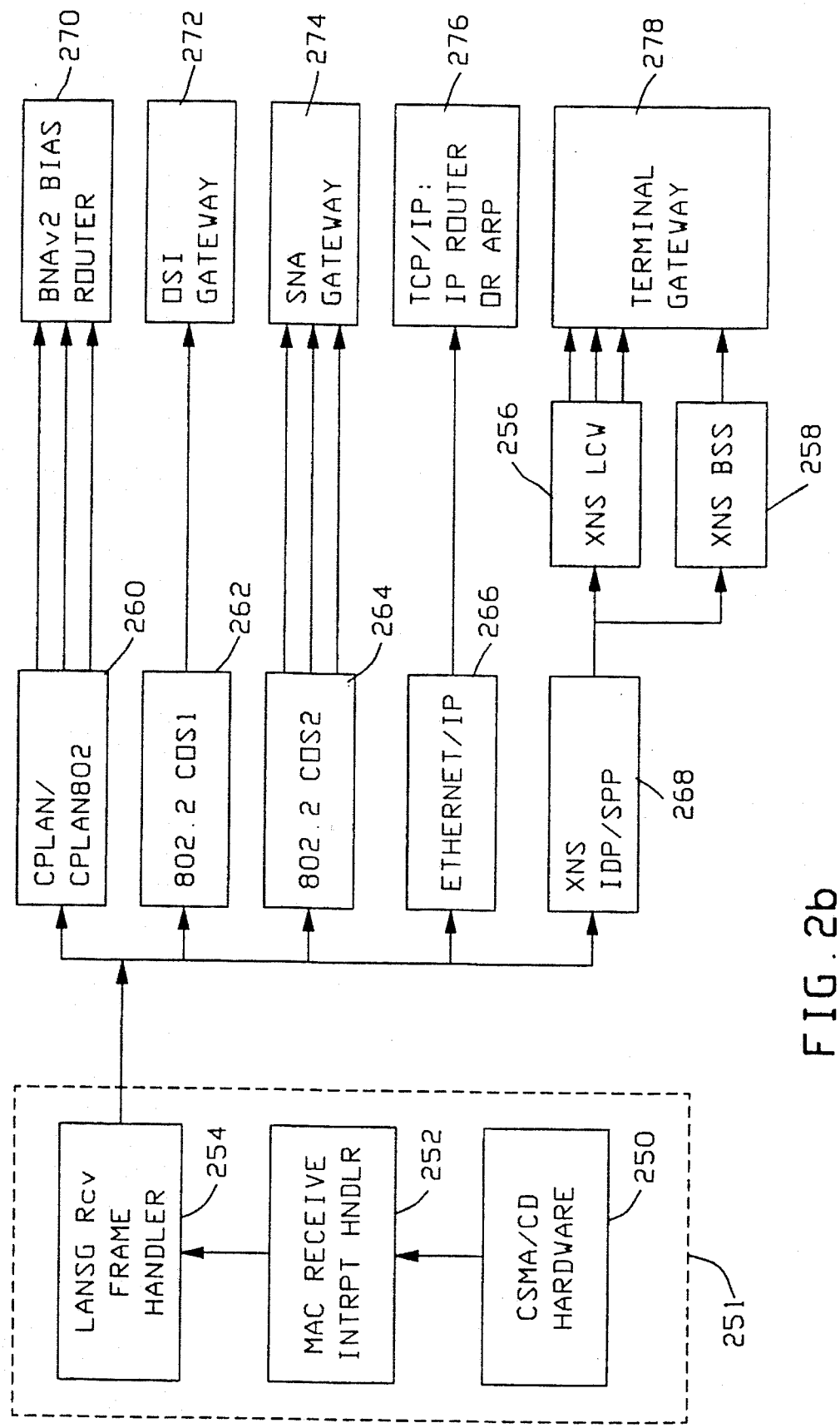

The process used by the line module 251 to receive, examine and identify the particular format associated with the protocol used for data transmission is illustrated in FIG. 2b which is a high-level data flow diagram depicting the dataflow through the various network layers of FIG. 2a.

In FIG. 2a, a data frame is first received from the network by the CSMA/CD circuitry 250. When the circuitry 250 has received the frame, it interrupts the line module processor (not shown). This interrupt is processed by the MAC receive interrupt handler 252 which retrieves the frame from the circuitry 250 and passes it on to the receive frame handler 254. The receive frame handler 254 parses the frame to determine its format and to pass it to an appropriate routine to determine its destination. These routines are the CPLAN routine 260, the 802.2 COS1 routine 262, the 802.2 COS2 routine 264, the Ethernet/IP routine 266 and the XNS routine 268. Each of these routines converts the data frame to a data-link packet and causes the line module to transmit the packet to its destination. For CPLAN packets, this transmission is via the BNAv2 Bias Router 270; For COS1 packets it is via the OSI gateway 272; for COS2 packets it is via the SNA gateway 274, for Ethernet packets it is via the IP router 276 and for XNS packets it is through the terminal gateway 278 via either the XNS BSS routine 258 or XNS LCW routine 256, as appropriate. A discussion of multi-vendor, multi-protocol systems, with particular emphasis on OSI, SNA and TCP/IP is found in R. J. Cypser, *Communications for Cooperating Systems*, Addison Wesley (1991) which is herein incorporated by reference.

The practical consequence of this feature is that workstations connected by a LAN (i.e., the integrated desktops) can seamlessly and concurrently communicate with computing systems from multiple vendors, each having a different network architecture, over the same physical connection. The integrated desktop, thus, provides system support for an efficient and fully integrated processing environment.

II. Detailed Description of the Exemplary Embodiment

The present invention, which includes the aspects as mentioned in the Overview, contributes to an overall network integration scheme that enables both multi-vendor, multi-protocol integration and high-speed (i.e., LAN speed) terminal emulation. In the exemplary embodiment, the major components of an integrated processing environment employing the present invention include the workstations 310a–n connected by the LAN 320, the CP 312 (including line modules 251 and 315), and the computer platforms 314 and 316 (see FIG. 3). Although much of the functionality for the various aspects of the present invention reside in the CP, it is also contemplated that this same functionality could reside completely within any of the workstations and/or the platforms or may be distributed among them.

A. Communication Processor (CP)

A communications processor suitable for providing the well-known features/context for the various aspects of the present invention is the CP2000 available from Unisys Corp. The present invention also uses new functionality which has been added to the CP2000.

Included in the CP 312 are a plurality of line modules (e.g. 251 and 315). In the exemplary embodiment, there may be as many as seven line modules (not shown). As described above with reference to FIG. 2b, the line modules provide a hardware platform for an aspect of the present invention which includes receiving data frames on the physical connection (CSMA/CD); examining the data frames and identifying the format; determining the destination of the received frame; and, finally, servicing the communication link. It should be noted that a data frame, generally, is a packet of data of a predetermined, finite size having header (or trailer) information appended thereto.

In addition, the new interface functionality includes the extension to XNS SPP software for segmenting and reassembling messages; negotiating maximum packet size; and discovering partner LAN addresses.

1. Line Module

The line module (LM) provides 802.3 compatible hardware (including an 802.3 compatible transceiver) for handling CSMA/CD data frames. Additionally, it is capable of handling two simultaneously active LAN connections (Dual-Active LAN with memory arbitration). In the exemplary embodiment of the present invention, the LM includes an Intel 82586 LAN Coprocessor and an 82501 Ethernet Serial Interface and two buffers, one for each active LAN connection. The logical structure of the LM 251 is illustrated in FIG. 2b.

2. LAN Station Group

Figure 4:
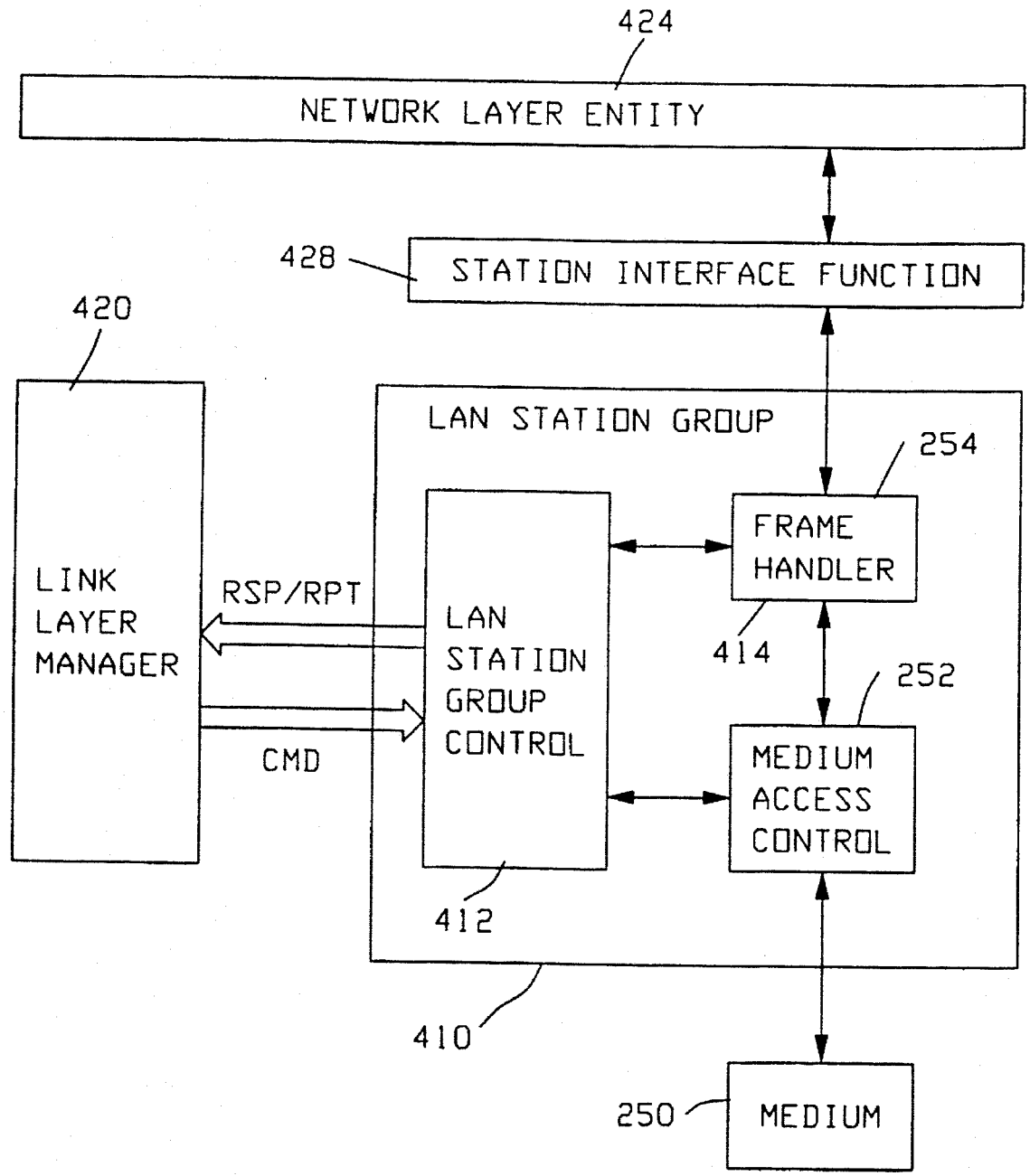
FIG. 4 is a functional block diagram of the LAN Station Group functionality supported by the communications processor (CP) and line modules of the system shown in FIG. 3.

FIG. 4 is a functional block diagram illustrating the major modules and interfaces of the LAN Station Group (LAN SG) 410 as supported by the LM.

LAN SG 410 includes support of the following new features: (1) Ethernet standards, (2) IEEE 802.3 (MAC) level standards, (3) IEEE 802.2 (LLC) level standards (i.e., COS1 and COS2), (4) Dual Active LAN via the line modules, (5) LAN-Connected Workstations (LCW) and (6) boot services.

The connection attribute "CLASS" is used, at the LLC level, to determine which type of protocol is running. This attribute is settable and defaults to the previously supported standard of proprietary CPLAN. The other enumerated "CLASS" types include:

CPLAN—a Unisys proprietary LAN station;
Class1—an 802 COS1 station;
Ethip—an Ethernet station for TCP/IP;
XNS802—an XNS station for LCW;
XNSBSS—an XNS station for BSS;
Class2—an 802 COS2 station; and
CPLAN802—a IEEE 802.3 compatible CPLAN station.

LAN SG 410 handles the coexistence of different types of frames including multicast/broadcast frames, 802 frames, Ethernet frames and CPLAN frames.

Ethernet and COS1 stations are connectionless and are therefore capable of communications with several different devices at the same time. Thus, it is only necessary to configure one COS1 station per Service Access Point (SAP), or one Ethernet station per Ethernet Type at a time. The station group can, however, support more than one CPLAN station (one station per connection) at a time.

In the exemplary embodiment of the present invention, however, at least one CPLAN station is configured for Down Line Load (DLL) purposes.

LAN SG 410 comprises three major components: (1) Station Group Control (SGC) 412, (2) Frame Handler (FH) 254, and (3) Medium Access Control (MAC) 252. The FH 254 and MAC 252 are also shown in FIG. 2b.

SGC 412 provides the interface between Link Layer Manager (LLM) 420 and each component of LAN SG 410. This interface is implemented through two queues rsp/rpt and cmd. FH 254 determines the type of input frame received (e.g. Ethernet, CPLAN, or 802 COS1) and the particular station to which the frame is destined. FH 254 interfaces to the Network Layer Entity (NLE) 424 via the Station Interface Function (SIF) 428 to determine the location of the destination station. The NLE 424 provides this information through the discovery function, described below. As described above, MAC 252 provides the physical reception and transmission of frames from medium 430 (e.g. the network 320).

The methods by which FH 254 determines the frame type and destination station are based on the frame format, a source address, a "CLASS" attribute setting, and, if present, a Destination Service Access Point (DSAP). These methods are further described below in the Frame Identification section and the Station Identification section, respectively.

Table 1 shows the different frame types supported by the LLCs:

TABLE 1

| TYPE 1: | Exchange ID (XID) |
| | Unnumbered Information (UI) |
| | TEST |
| TYPE 2: | Information (numbered) |
| | Receive Ready (RR) |
| | Receive Not Ready (RNR) |
| | Reject (REJ) |
| | Set Async Balance Mode Ext (SABME) |
| | Disconnect (DISC) |
| | Unnumbered Acknowledgment (UA) |
| | Disconnected Mode (DM) |
| | Frame Reject (FRMR) |

It should be noted that Class I (COS1) LLCs only support Type 1 frames and operations; whereas, Class 2 (COS2) LLCs support both Type 1 and Type 2 operations. Also, CPLAN is a Class I LLC.

Table 2 shows the format of the XID frame listed in Table 1:

TABLE 2

| XID FRAME | |
| --- | --- |
| 6 bytes | Destination address & group/individual bit |
| 6 bytes | Source Address |
| 6 bytes | 802 Length |
| 1 byte | DSAP & Poll/Final bit |
| 1 byte | SSAP |
| 1 byte | Control = XID |
| 1 byte | XID format ID |
| 5 bits | LLC class |
| 4 bits | Reserved |
| 7 bits | Receive window size | a. Frame Identification

In FH 254, a received frame is parsed and identified by recognizing the differences among the frame formats and field settings for CPLAN, XNS, Ethernet, COS1 and COS2.

FIG. 5 shows the frame formats for Ethernet and 802/CPLAN frames. As shown in the Figure, the Ethernet frame, at the data link layer, includes a destination address, a source address and a type field. The remainder of the Ethernet frame is client layer information and 4 bytes of a frame check sequence.

In contrast, the 802/CPLAN frame, at the data link layer, includes a destination address, a source address and a length field. Additionally, it includes the Destination Service Access Point (DSAP), Source Service Access Point (SSAP) and control field at the LLC layer. And, the remainder of the 802/CPLAN frame is client layer information and 4 bytes of a frame check sequence.

As illustrated in FIG. 5, there are several differences in the frame formats which FH 254 uses to identify a particular frame type.

One difference is the type versus length fields. As a preprocessing measure, the value of the type/length field of a received frame is byte reversed by MAC 252. This field is then used to distinguish between Ethernet frames and COS1 or CPLAN frames.

For Ethernet frames this field is always greater than 1500. The current values for an Ethernet type field are:

Eth_IP=#0800 (2048—Client Layer:TCP/IP)
Eth_ARP=#0806 (2054—Client Layer:Address Resolution Protocol)

where #NNNN indicates that the number NNNN is in hexadecimal notation.

For COS1 frames, this field is less than 1500 and represents the length (in bytes) of the frame received.

For CPLAN and CPLAN802 frames this field contains the length of the frame, however, it is possible that in unnumbered information (UI) or TEST frames (see Table 1) this length may be as large as 6000 bytes. In addition, CPLAN frames contain a length field which is byte-reversed compared to the other frame formats.

In the case of broadcast and multicast frames, these are only handled by Ethernet, COS1 and XNS. If a frame has the group address bit set (broadcast or multicast), it is either Ethernet, COS1 or XNS. If the frame is an XNS frame it contains a checksum of #FFFF in the fields following the MAC fields. XNS frames exist above either Ethernet or 802.3 frame formats (see FIG. 3), so that an XNS frame, once it has been recognized, is immediately sent to an XNS handler. Otherwise, the Type/Length field is checked to determine if the frame is Ethernet or COS1.

Frames which are not broadcast or multicast are identified, as mentioned, by the inherent differences of the formats.

FIG. 6 is a psuedo-code representation of a process which examines and identifies the possible frame formats based on their differences.

The first step of this process, step 602, determines whether the Type/Length field is less than 1500. If so, the procedure branches to step 610, where the checksum field is checked. At step 610, if Checksum equals #FFFF then the frame is identified as an XNS frame and the procedure branches to step 620 and ends.

If, however, in step 610, the frame is not identified as an XNS frame, the procedure advances to step 612. In step 612, the remote address list is checked to see if there is a match with the address of the source of the frame. If not, the procedure branches to step 618, identifies the frame as COS1 and ends. If a match is found at step 612, the Class attribute is checked to determine whether the frame is a CPLAN frame, step 614, or a COS2 frame, step 616.

If, in step 602, the Type/Length field is greater than 1500, then the procedure advances to step 604. In step 604, if the Control_Field (see Tables 1 and 2) equals UI or TEST and SSAP=Router and DSAP=Router then the frame is identified as a CPLAN frame and the procedure branches to step 620 and ends.

If the conditions of step 604 are not satisfied, then the procedure advances to step 606. In step 606, if the checksum=#FFFF then the frame is identified as and XNS frame and the procedure ends. If the checksum is not equal to #FFFF at step 606 then, at step 608, the frame is identified as an Ethernet frame and the procedure ends.

It should be noted that the algorithm is not completely fail-safe because there is a slim possibility that an Ethernet frame can contain data which exactly matches the control, DSAP and SSAP fields specified above, and would therefore be mistaken for a CPLAN frame. This problem is, however, unavoidable because of the possibility of receiving CPLAN frames with a length greater than 1500. Currently, TCP/IP and ARP use values in these fields which are different from those used in CPLAN frames.

FIG. 7 summarizes the handling of received frames whether addressed to a group of network connections or to an individual connection. In FIG. 7, if the received frame is group addressed, then the process follows the decision flow on the left side (broadcast); if the received frame is individually addressed, then the process follows the decision flow on the right side (non-broadcast).

For group addressed frames, if the Type/Length field is greater than 1500 and the checksum equals #FFFF, then the frame is XNS else it is Ethernet. If the Type/Length field is less than 1500 then, if the checksum equals #FFFF, the frame is identified as XNS otherwise it is identified as COS1.

The decision flow on the right side of FIG. 7 (non-broadcast) directly corresponds to the pseudo-code of FIG. 6 for identifying individually addressed frames.

b. Station Identification

Once the frame format has been determined by the above procedure, the station, if any, for which the frame is destined is identified using the destination address field of the frame.

Station identification, for connection-oriented stations, is accomplished by finding the station with the unique remote address as determined by the frame received. The unique remote address used is the remote MAC address stored in the station information header. This is used to index into a hash table and to find the matching station. The hash table is a list of connection-oriented stations known to the CP.

For connectionless COS1 stations, the station is identified by its Service Access Point (SAP) and CLASS which are maintained in a connectionless stations list. In the exemplary embodiment of the present invention, for connectionless Ethernet stations, the first station with the matching CLASS attribute in the list is selected as the receiving station because there is no need for more than one Ethernet station. However, it is contemplated, that if the need for more than one Ethernet station should arise, Ethernet stations can be further identified by their TYPE.

The local and remote SAP for a station are determined using an Open Station Dialog (OSD) operation. An OSD is initiated by establishing a call on a particular LAN station (or device) within the LAN Station Group. In the exemplary embodiment of the present invention, there are several different types of LAN stations: CPLAN stations, CPLAN802 stations, Ethernet stations, COS1 stations, COS2 stations, XNS stations and BSS stations. In addition, the station attribute designated CLASS is used to determine the station type at the LLC level (e.g., class1 for OSI NLEs). Once the destination has been determined, the frame can be routed to its destination through the BNAv2 Bias router 270, OSI Gateway 272, SNA gateway 274, IP Router 276 or Terminal Gateway 278, as shown in FIG. 2b.

B. LAN-Connected Workstations

In the exemplary embodiment of the present invention, the protocol used by the workstations to communicate with the terminal gateway 278 (see FIGS. 2a, 2b and 3) of the CP 312 is XNS SPP standard software (or Novell's version: SPX). The XNS SPP standard and the programmatic interface to SPX are described in the following documents which are herein incorporated by reference: (1) *Xerox Systems Integration Standard: Internet Transport Protocols* (form XSIS 0281122), (2) *Advanced NetWare Internetwork Packet Exchange Protocol (IPX) with Asynchronous Event Scheduler (AES)* (Novell form 101-000242-001), and (3) *Advanced NetWare Sequenced Packet Exchange Protocol (SPX)* (Novell form 101-000243- 001).

To operate effectively however, the CP terminal gateway desirably serves stations that are connection-oriented and that guarantee in-order delivery of messages. Although SPX provides a form of these services, the attendant limitations have been overcome by developing several enhancements to SPP (which are compatible with SPX as well) referred to as LCW. LCW runs, on both the workstation and the CP, at a higher protocol layer than XNS SPP as depicted in FIGS. 2a and 2b.

First, most popular PC LAN adapters are restrictive in the maximum size of frames they can send or receive. Typically, 1,496 bytes is all a PC can transfer in a single frame. Since terminal traffic requires message sizes of 1,920 or more bytes, the LCW software enhances SPX by segmenting the messages into frames and reassembling them at the other side of the link.

Second, since the maximum frame size can vary from PC to PC and since the default size specified by SPX is only 534 bytes, a negotiation occurs when the SPX connection is opened between the PC and the CP. The result of the negotiation is that both the PC and the CP know the maximum size of frames the PC can transfer.

Third, to avoid the burden of configuring Ethernet addresses for each PC, LCW contains a mechanism for discovery of LAN addresses.

It should be noted that the formats for the frames described below are presented in Tables 3a through 3g.

TABLE 3a

LCW Greeting

| Offset | Field | Size | Value |
|---|---|---|---|
| 0 | Checksum | 2 bytes | #FFFF |
| 2 | Length | 2 bytes | 30 |
| 4 | Transport Control | 1 byte | |
| 5 | Packet Type | 1 byte | #FE |
| 6 | Destination Network | 4 bytes | <Network ID> |
| 10 | Destination Node | 6 bytes | #FFFFFFFFFFFF |
| 16 | Destination Socket | 2 bytes | <Socket ID> |
| 18 | Source Network | 4 bytes | |
| 22 | Source Node | 6 bytes | <Source LAN Addr.> |
| 28 | Source Socket | 2 bytes | <Socket ID> |

TABLE 3b

Establish Connection

| Offset | Field | Size | Value |
|---|---|---|---|
| 0 | Checksum | 2 bytes | #FFFF |
| 2 | Length | 2 bytes | 42 |
| 4 | Transport Control | 1 byte | |
| 5 | Packet Type | 1 byte | #05 |
| 6 | Destination Network | 4 bytes | <Dest Network ID> |
| 10 | Destination Node | 6 bytes | <Dest LAN Addr.> |
| 16 | Destination Socket | 2 bytes | <Socket ID> |
| 18 | Source Network | 4 bytes | |
| 22 | Source Node | 6 bytes | <Source LAN Addr.> |
| 28 | Source Socket | 2 bytes | <Socket ID> |
| 30 | Connection Control | 1 byte | #C0 |
| 31 | Datastream Type | 1 byte | |
| 32 | Source Connection ID | 2 bytes | <Connection ID> |
| 34 | Dest. Connection ID | 2 bytes | #FFFF |
| 36 | Sequence No. | 2 bytes | |
| 38 | Acknowledgement No. | 2 bytes | |
| 40 | Allocation No. | 2 bytes | |

TABLE 3c

Establish Connection Response

| Offset | Field | Size | Value |
|---|---|---|---|
| 0 | Checksum | 2 bytes | #FFFF |
| 2 | Length | 2 bytes | 42 |
| 4 | Transport Control | 1 byte | |
| 5 | Packet Type | 1 byte | #05 |
| 6 | Destination Network | 4 bytes | <Dest Network ID> |
| 10 | Destination Node | 6 bytes | <Dest LAN Addr.> |
| 16 | Destination Socket | 2 bytes | <Socket ID> |
| 18 | Source Network | 4 bytes | |
| 22 | Source Node | 6 bytes | <Source LAN Addr.> |
| 28 | Source Socket | 2 bytes | <Socket ID> |
| 30 | Connection Control | 1 byte | #80 |
| 31 | Datastream Type | 1 byte | |
| 32 | Source Connection ID | 2 bytes | <Source Conn. ID> |
| 34 | Dest. Connection ID | 2 bytes | <Dest. Conn. ID> |
| 36 | Sequence No. | 2 bytes | |
| 38 | Acknowledgement No. | 2 bytes | |
| 40 | Allocation No. | 2 bytes | |

TABLE 3d

Segment Sizing Request

| Offset | Field | Size | Value |
|---|---|---|---|
| 0 | Checksum | 2 bytes | #FFFF |
| 2 | Length | 2 bytes | 44 |
| 4 | Transport Control | 1 byte | |
| 5 | Packet Type | 1 byte | #05 |
| 6 | Destination Network | 4 bytes | <Dest Network ID> |
| 10 | Destination Node | 6 bytes | <Dest LAN Addr.> |
| 16 | Destination Socket | 2 bytes | <Socket ID> |
| 18 | Source Network | 4 bytes | |
| 22 | Source Node | 6 bytes | <Source LAN Addr.> |
| 28 | Source Socket | 2 bytes | <Socket ID> |
| 30 | Connection Control | 1 byte | #50 |
| 31 | Datastream Type | 1 byte | #80 |
| 32 | Source Connection ID | 2 bytes | <Dest. Conn. ID> |
| 34 | Dest. Connection ID | 2 bytes | <Source Conn. ID> |
| 36 | Sequence No. | 2 bytes | |
| 38 | Acknowledgement No. | 2 bytes | |
| 40 | Allocation No. | 2 bytes | |
| 42 | Max Packet Size | 2 bytes | <Value No. 1> |

TABLE 3e

Segment Sizing Response

| Offset | Field | Size | Value |
|---|---|---|---|
| 0 | Checksum | 2 bytes | #FFFF |
| 2 | Length | 2 bytes | 44 |
| 4 | Transport Control | 1 byte | |
| 5 | Packet Type | 1 byte | #05 |
| 6 | Destination Network | 4 bytes | <Dest Network ID> |
| 10 | Destination Node | 6 bytes | <Dest LAN Addr.> |
| 16 | Destination Socket | 2 bytes | <Socket ID> |
| 18 | Source Network | 4 bytes | |
| 22 | Source Node | 6 bytes | <Source LAN Addr.> |
| 28 | Source Socket | 2 bytes | <Socket ID> |
| 30 | Connection Control | 1 byte | #50 |
| 31 | Datastream Type | 1 byte | #81 |
| 32 | Source Connection ID | 2 bytes | <Dest. Conn. ID> |
| 34 | Dest. Connection ID | 2 bytes | <Source Conn. ID> |
| 36 | Sequence No. | 2 bytes | |
| 38 | Acknowledgement No. | 2 bytes | |
| 40 | Allocation No. | 2 bytes | |
| 42 | Max Packet Size | 2 bytes | <Value No. 2 ≦ Value No. 1> |

TABLE 3f

Segment Sizing Acknowledgement

| Offset | Field | Size | Value |
|---|---|---|---|
| 0 | Checksum | 2 bytes | #FFFF |
| 2 | Length | 2 bytes | 44 |
| 4 | Transport Control | 1 byte | |
| 5 | Packet Type | 1 byte | #05 |
| 6 | Destination Network | 4 bytes | <Dest Network ID> |
| 10 | Destination Node | 6 bytes | <Dest LAN Addr.> |
| 16 | Destination Socket | 2 bytes | <Socket ID> |
| 18 | Source Network | 4 bytes | |
| 22 | Source Node | 6 bytes | <Source LAN Addr.> |
| 28 | Source Socket | 2 bytes | <Socket ID> |
| 30 | Connection Control | 1 byte | #50 |
| 31 | Datastream Type | 1 byte | #82 |
| 32 | Source Connection ID | 2 bytes | <Dest. Conn. ID> |
| 34 | Dest. Connection ID | 2 bytes | <Source Conn. ID> |
| 36 | Sequence No. | 2 bytes | |
| 38 | Acknowledgement No. | 2 bytes | |
| 40 | Allocation No. | 2 bytes | |
| 42 | Max Packet Size | 2 bytes | <Value No. 3 ≦ Value No. 2> |

TABLE 3g

Allocation Grant

| Offset | Field | Size | Value |
|---|---|---|---|
| 0 | Checksum | 2 bytes | #FFFF |
| 2 | Length | 2 bytes | 44 |
| 4 | Transport Control | 1 byte | |
| 5 | Packet Type | 1 byte | #05 |
| 6 | Destination Network | 4 bytes | <Dest Network ID> |
| 10 | Destination Node | 6 bytes | <Dest LAN Addr.> |
| 16 | Destination Socket | 2 bytes | <Socket ID> |
| 18 | Source Network | 4 bytes | |
| 22 | Source Node | 6 bytes | <Source LAN Addr.> |
| 28 | Source Socket | 2 bytes | <Socket ID> |
| 30 | Connection Control | 1 byte | #50 |
| 31 | Datastream Type | 1 byte | #F0 |
| 32 | Source Connection ID | 2 bytes | <Dest. Conn. ID> |
| 34 | Dest. Connection ID | 2 bytes | <Source Conn. ID> |
| 36 | Sequence No. | 2 bytes | |
| 38 | Acknowledgement No. | 2 bytes | |
| 40 | Allocation No. | 2 bytes | |

1. Segmentation and Reassembly

Figure 8A:
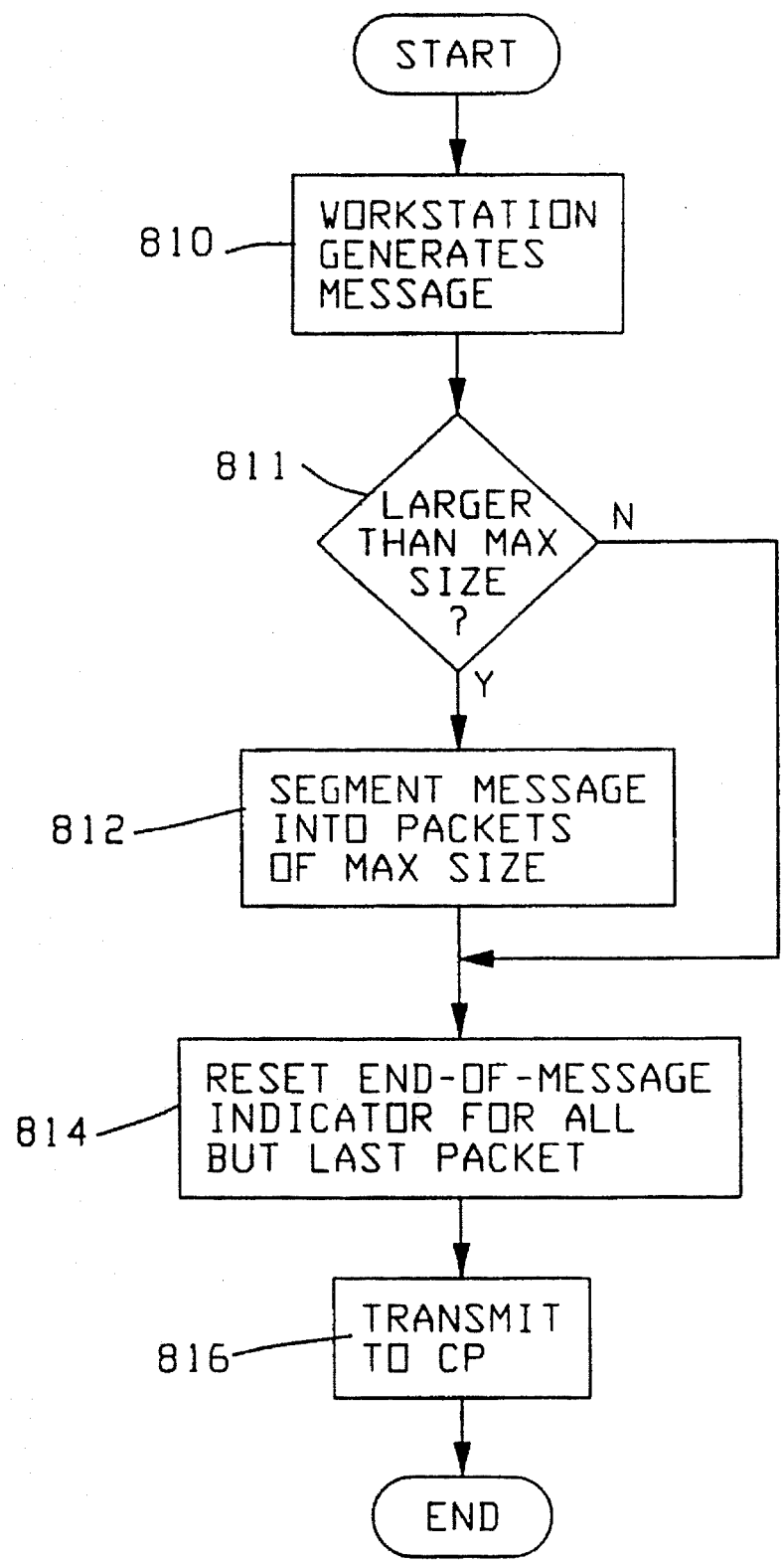
FIG. 8a is a flowchart diagram which illustrates message segmentation as it occurs in the workstation of FIG. 3.
Figure 8B:
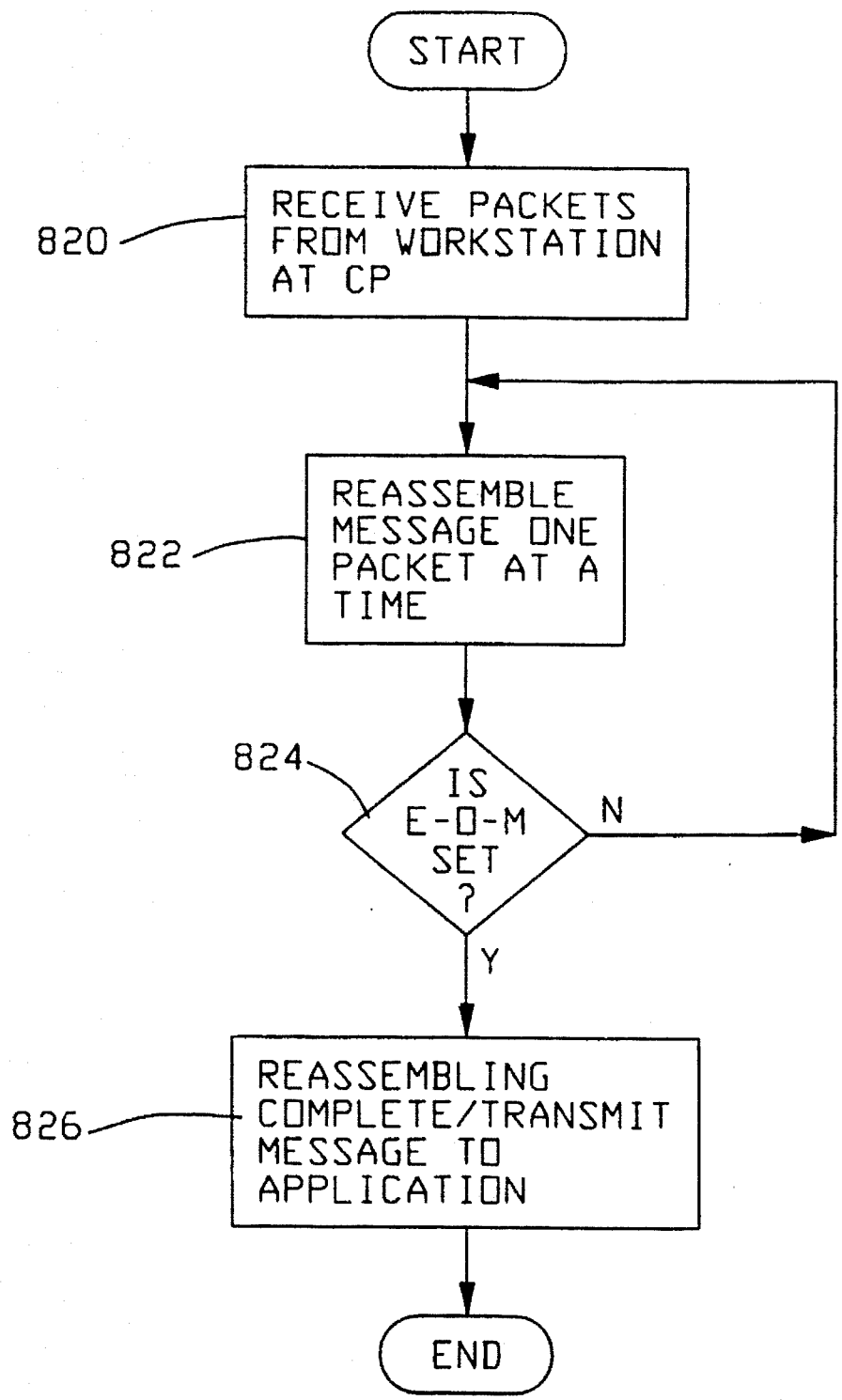
FIG. 8b is a flowchart diagram which illustrates message reassembly as it occurs in the CP of FIG. 3.

Referring to FIGS. 8a and 8b, the process of segmenting and reassembling messages is described. It should be noted that the flowcharts of FIGS. 8a and 8b only show communication from the workstation to the application, thus, communication from the application to the workstation occurs in the reverse order.

Because SPX and/or PC LAN adaptors do not support packet sizes larger than 1514 bytes, segmentation and reassembly of terminal data streams is performed. Typical terminal messages range up to 2500 bytes in size, with some applications using messages sizes much larger. Although SPX does not provide a segmentation service, the SPP frame format allows a segmentation service to be provided by an application.

Within the SPP header is a Connection Control field (e.g. see tables 3b). This field contains a bitmask which provides information about the frame. One of the bits available is the End-of-Message (EOM) bit. Although SPX does not use the bit, it does pass it to/from the application, thus, the LCW protocol uses this bit.

At step 810 of FIG. 8a, the workstation generates a message and supplies the message to the LCW to be transmitted to its destination. In LCW, at step 811, the message is tested to determine if it is larger than the maximum packet size. If so, at step 812 the LCW invokes a routine which segments the message into packets each of which is less than MAXSIZE. The EOM bit is reset in all frames except the last one, step 814. At step 816, the LCW sends the message segments onto the network 320 via the SPX 311 (see FIG. 3).

Referring to FIG. 8b, at step 820, the receiving partner receives the packets from the network, as described above. It then reassembles packets, step 822, until one arrives with the EOM set, step 824. The message is then considered complete, and is delivered to the application, step 826. Thus, LCW does segmentation and reassembly, uses SPX to send/receive the segments.

In the exemplary embodiment of the present invention, the receiving partner can be either a workstation 310 or the CP 312 and the application would then be either running on a one of the computer systems 314 and 316 or the workstation 310, respectively.

2. Renegotiation of Packet Size

Figure 9:
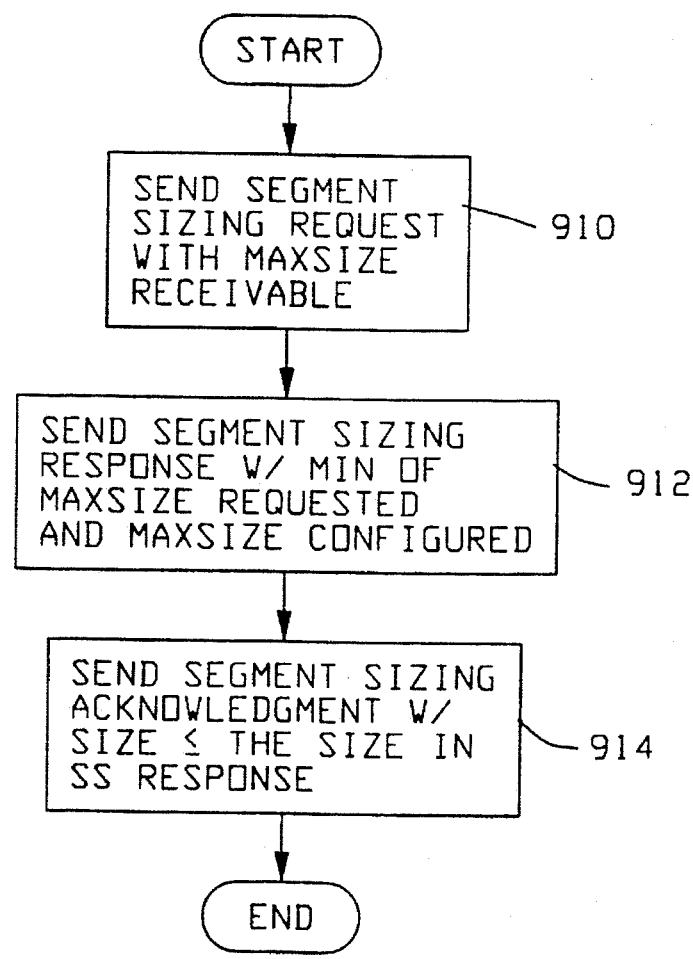
FIG. 9 is a flowchart diagram which illustrates maximum packet size renegotiation as it occurs between a workstation and the CP of FIG. 3.

Referring to FIG. 9, the process of renegotiating maximum packet size is described. It should be noted that the flowchart of FIG. 9 applies whether the renegotiation is initiated by one of the workstations 310a–n or the by the CP 312.

In some instances, performance of the LCW connections can be improved by increasing the size of packets exchanged by the connection partners. At least for IPX (Novell's version of XNS IDP), the specific default size for a packet is 534 bytes which includes 42 bytes of SPX header. Some LAN adapter drivers allow packets of up to 1514 bytes (including SPX header).

Each partner may optionally initiate the negotiation phase. A partner (for example, Partner A) does so by issuing a Send Sequenced Packet request (Segment Sizing Request, see Table 3d) containing the value #80 in the DataStream field of the header, and the maximum size packet that can be received by Partner A in the data portion of the frame, step 910. The data is always presented in 'network-order,' that is high-order byte first through low-order byte last.

When the other partner (Partner B) receives this Segment Sizing Request, it responds by issuing a Send Sequence Packet request (Segment Sizing Response, see Table 3e), which contains the value #81 in the DataStream field, and the minimum of: (1) the requested packet size and (2) the maximum packet size that Partner B is configured to send, step 912. Partner B may not send any non-control packets to Partner A until a Segment Sizing Acknowledgment (see Table 3f) is received from Partner A, step 914. This acknowledgment is a data frame with the value #82 in the DataStream field, and the final size (which is less-than-or-equal-to the value in the Segment Sizing Response) in network order.

The sequence described above determines the maximum size of packets sent from Partner B to Partner A. In other words, a partner may negotiate the size of packets that it will receive. Either partner may begin negotiation at any time. The other partner should not send data during the negotiation process. The value sent in the Segment Sizing Response and Acknowledgment is less-than-or-equal-to the value in the preceding packet.

It should be noted that, in the exemplary embodiment of the present invention, the CP does not initiate packet size negotiation, unless the workstation does so first. This means that for a particular workstation 310a, until the workstation initiates a renegotiation of packet size for a connection with the CP 312, the CP will not initiate communication to the workstation 310a because the CP 312 does not know if the workstation is programmed with that capability (practically speaking, this ensures backward compatibility with workstations not equipped with this feature).

If the CP does negotiate its receive packet size, however, it requests to be sent packets of size equal to a MAXINPUTMESSAGESIZE attribute for the BNA connection. Since this value is typically 2500 bytes or larger, the workstation responds with a value supported by IPX and the hardware. The LCW code on the workstation determines this by calling the IPX entry point with the value #0D in the BX register. After the return from IPX, the AX register contains the maximum packet size supported. This function is available on IPX version 3.1 and higher.

3. Discovery of LAN partner addresses

Figure 10A:
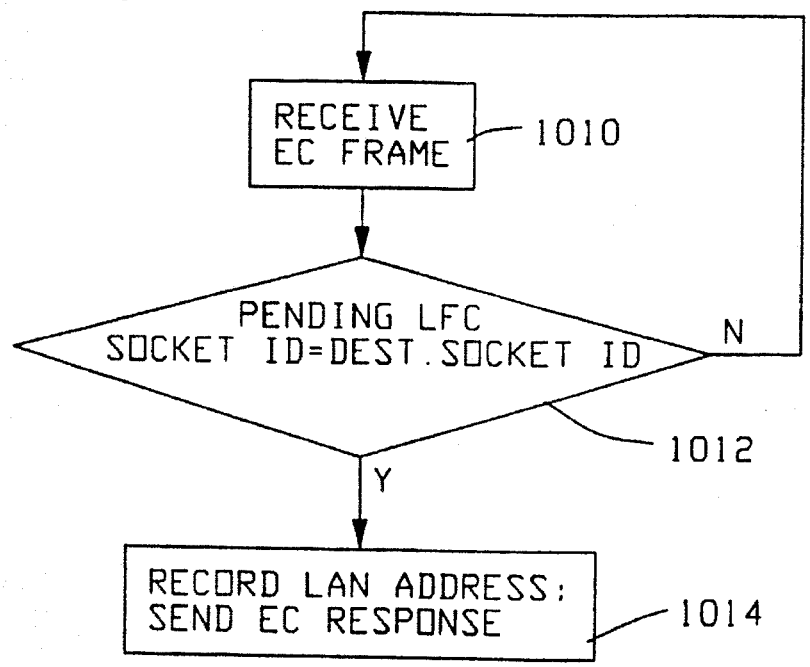
FIGS. 10a–10c are flowchart diagrams which illustrate LAN address discovery as it occurs in the CP of FIG. 3.

XNS SPP (Novell SPX) employs Establish Connection (EC) frames (see Table 3a) to open a connection between two partners. The process by which this occurs is illustrated by the flowchart diagram of FIG. 10a. For the exemplary process, the EC frame is a system SPP packet with the Destination Connection Id field set to #FFFF. Upon receipt of such a frame at step 1010, the SPP protocol module, at step 1012 checks for an outstanding Listen for Connection (LfC) request with a Socket ID which matches the Destination Socket ID of the incoming EC frame. In the exemplary embodiment of the present invention, the LCW protocol requires the Destination and Source Socket IDs to be equal.

If, at step 1012, a matching LfC is found, then, at step 1014, the LAN Address of the partner is recorded, and an EC Response (see Table 3c) is sent by SPX to the partner. The connection is then considered open. Otherwise, control is returned to step 1010 to wait until another frame is received.

Figure 10B:
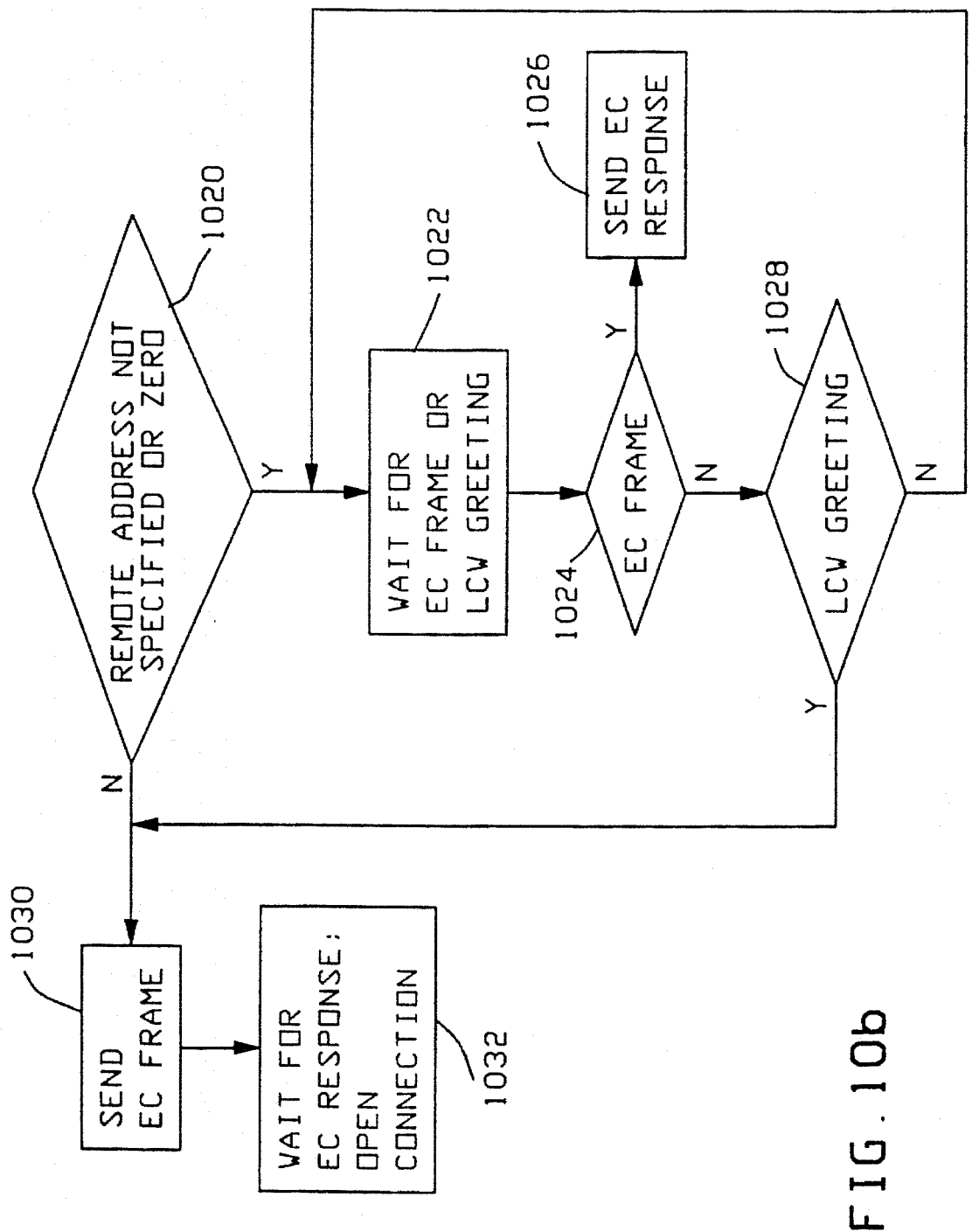

The discovery process at the CP 312 is shown in the flow-chart diagram of FIG. 10b. If, at step 1020, the REMOTEADDRESS attribute is not specified in the CP connection, or if it is set to zero, the CP does not issue any EC frames for that connection. Accordingly, control is transferred to step 1022 where the CP 312 waits for either an incoming EC with a matching Socket ID, or a special broadcast LCW Greeting frame. An LCW Greeting frame (see Table 3a) is an XNS IDP (Novell IPX) packet with a value of #FE in the PacketType field. If, at step 1022, an EC is received, then if at step 1024, the workstation has a target LAN Address configured, the connection opens, at step 1026, as described above. If, at step 1024, the workstation does not have a target address specified, but, at step 1028 the CP receives an LCW Greeting frame with a matching Socket ID, the CP, at step 1030, records the Source LAN Address from the frame and issues an EC back to that address. The partner workstation should have posted a LfC prior to issuing the Greeting frame. If it did, an EC Response is returned and detected at step 1032 opens the connection.

Figure 10C:
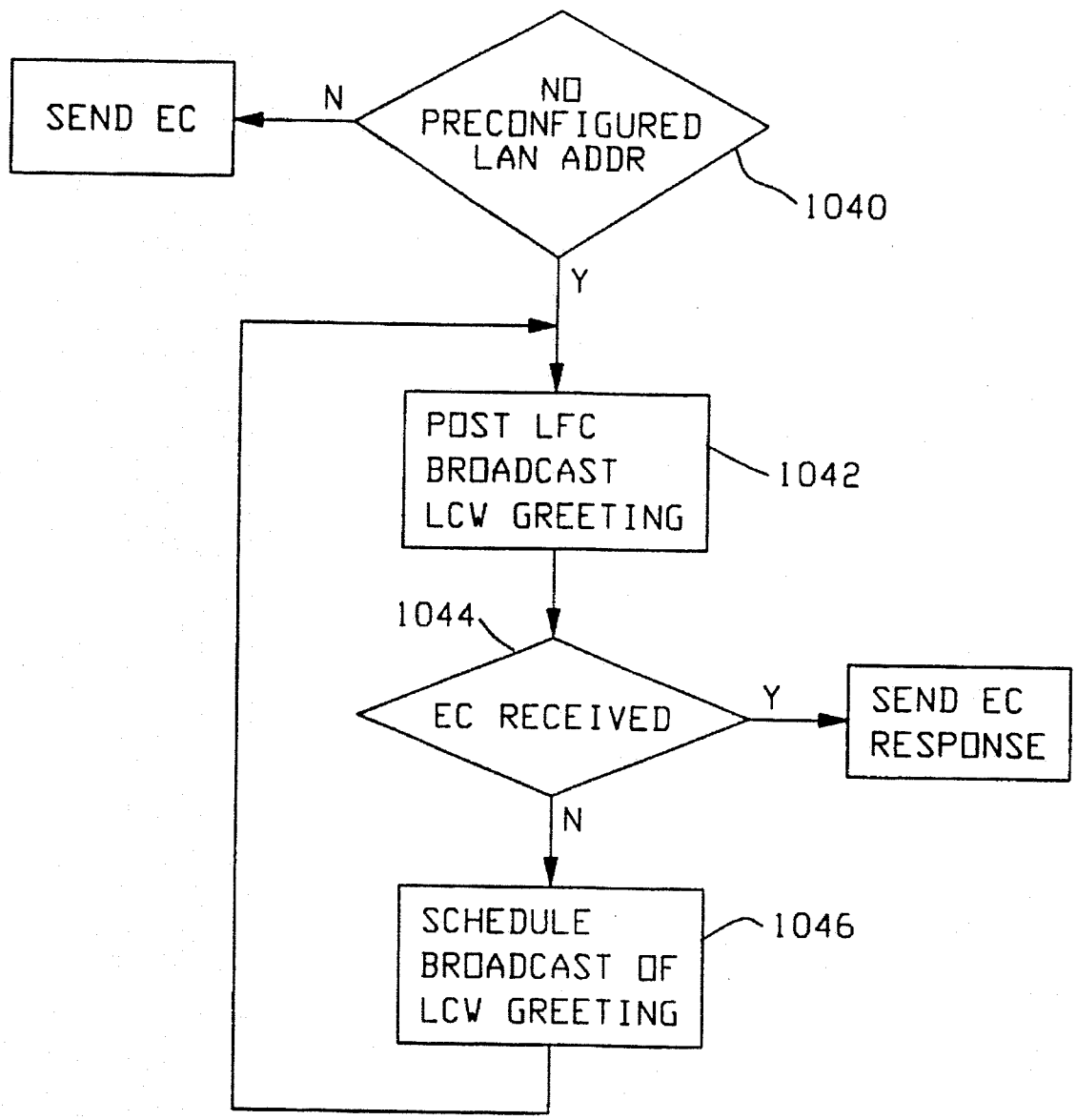

As shown in FIG. 10c, The workstation 310 behaves differently than the CP in the absence of a preconfigured LAN Address. When, at step 1040, the workstation 310 determines that it does not have a preconfigured LAN address, instead of waiting for an incoming EC, the workstation LCW code, at step 1042, tries to force the CP to issue an EC by posting an LfC and then broadcasting an LCW Greeting frame. As described above, the Greeting frame identifies the workstation's LAN Address to the CP. If, at step 1044, an EC request is not received in response to the LCW Greeting frame, the CP connection is not active. In this case, the workstation LCW code, at step 1046, reissues the broadcast Greeting frame according to a predetermined schedule. In the exemplary embodiment of the present invention, the schedule is to issue ten Greetings at one second intervals once every minute.

It should be noted that LCW discovers the 6-byte LAN Address only. It does not discover the 2-byte Socket ID, which identifies a particular connection, and facilitates the matching of partners. It should also be noted that if either target LAN Address is not specified, the Socket ID used by those partners must be unique in the network to avoid possible mismatched connections.

4. Flow-Control and Message Acknowledgment

Although XNS software (Novell's IPX) on the workstation sets a Acknowledgment-Requested bit on every SPP frame, the CP does not. To minimize processing overhead, the CP only sets the Acknowledgment-Requested bit in two circumstances: 1) when the EOM bit is set, and 2) when the CP XNS software determines that the flow-control allocation window is full. This prevents unnecessary acknowledgement packets from competing with message packets when the message is segmented.

The CP determines that the allocation window is full by comparing the Sequence Number of the frame being sent against the Allocation Number of the last frame received from the partner. The Allocation Number indicates the last Sequence Number that will be accepted by the partner. If the last Sequence Number sent equals the Allocation Number, no more frames may be sent until the receiving partner sends a frame with an increased Allocation Number. By setting the Acknowledgement-Requested bit on the last Allocated frame, the CP forces the partner to return a control frame that, hopefully, contains an increased Allocation Number.

If the receiving partner cannot allocate a larger number of frames, perhaps because the application is slow to read the incoming frames, the LCW software should detect this condition and force additional allocation to be granted as soon as possible. The receiving partner can detect this condition by noting when the last outstanding Listen for Sequenced Packet ECB is completed. When subsequent Listen for Sequenced Packet ECBs are posted, the receiving partner's LCW code should send an Allocation Grant frame (see Table 3g) to the sending partner, in which an increased Allocation Number is provided.

The following three articles describe various features and the installation of the LCW enhancements to XNS and are herein incorporated by reference: (1) R. A. Johnson, "LAN-Connected Workstations Via BNAv2, Part I", *Unisphere,* (January 1992); (2) R. A. Johnson, "LAN-Connected Workstations Via BNAv2, Part II", *Unisphere,* (February 1992); and (3) R. A. Johnson, "LAN-Connected Workstations Via BNAv2, Part III", *Unisphere,* (May 1992).

The present invention has been described in terms of exemplary embodiments. It is contemplated, however, that it may be practiced with modifications, some of which are outlined above, within the scope of the appended claims.

What is claimed:

1. In a system having at least one personal computer (PC) coupled to an interface means by a Local Area Network (LAN) connection, and at least one computer system coupled to said interface means, wherein said at least one PC does not have a preconfigured LAN address recorded at said interface means, wherein said system employs Xerox Network System (XNS) at a data link layer of a network architecture, a method for providing LAN address discovery of said one PC comprising the steps of:

a) posting a frame indicating that said at least one PC is looking for a connection (LfC frame);

b) broadcasting a frame, which identifies the LAN address for the at least one PC, from said at least one PC to said interface means through the LAN connection;

c) sending, in response to said broadcast frame, an establish connection (EC) frame from said interface means to said at least one PC;

d) sending, in response to said EC frame from said interface means, an EC frame from said at least one PC to said interface means;

e) opening, at said interface means, a logical connection between said at least one PC and said computer system; and f) identifying said logical connection, at said interface means, using said LAN address identified in said broadcast frame.

2. In a system having at least one personal computer (PC) coupled to an interface means by a Local Area Network (LAN) connection, and at least one computer system coupled to said interface means, said at least one PC and said interface means being communicating partners, wherein said system employs a predetermined network architecture having a data link layer and a client layer for network communications, wherein said system employs Xerox Network System (XNS) at a data link layer of a network architecture, a method for providing terminal emulation features at LAN speeds comprising the steps of:

a) segmenting messages transmitted across the LAN connection of the system to a communicating partner;

b) reassembling messages received on the LAN connection from the communicating partner;

c) negotiating maximum packet size with the communicating partner; and d) discovering, when necessary, LAN addresses for said at least one PC not having a preconfigured LAN address and requesting a connection, said step of discovering including 1) posting a frame indicating that said PC is looking for a connection (LfC frame);

2) broadcasting a frame, which identifies the LAN address for the at least one PC, from said at least one PC to said interface means through the LAN connection;

3) sending, in response to said broadcast frame, an establish connection (EC) frame from said interface means to said at least one PC;

4) sending, in response to said EC frame from said interface means, an EC frame from said at least one PC to said interface means;

5) opening, at said interface means, a logical connection between said at least one PC and said computer system; and 6) identifying said logical connection, at said interface means, using said LAN address identified in said broadcast frame.

\* \* \* \* \*